US005646485A

United States Patent [19]
Simon et al.

[11] Patent Number: 5,646,485
[45] Date of Patent: Jul. 8, 1997

[54] MOTOR VEHICLE DAYTIME RUNNING LIGHT SYSTEM HAVING BUCK SWITCH MODE CONVERTER

[75] Inventors: John David Simon, Darlington, Pa.; Michael Joseph Dreon, Utica, Mich.; William Lee Small, Cortland, Ohio; Pierre Youssef Abboud, Tucson, Ariz.; Brian Douglas Pasha, Cortland, Ohio

[73] Assignee: General Motors Corporation, Detroit, Mich.

[21] Appl. No.: 572,539

[22] Filed: Dec. 14, 1995

[51] Int. Cl.$^6$ .................................................. B60Q 1/02
[52] U.S. Cl. ................... 315/82; 315/83; 307/10.8
[58] Field of Search ............................... 315/82, 83, 76, 315/77, DIG. 7, 224, 291, 307, 311; 307/9.1, 10.8, 10.1

[56] References Cited

U.S. PATENT DOCUMENTS

| | | | |
|---|---|---|---|
| 3,828,220 | 8/1974 | Moore et al. | 315/82 |
| 3,832,597 | 8/1974 | Mitchell | 315/82 |
| 4,114,071 | 9/1978 | Thrower, Jr. et al. | 315/226 |
| 4,309,639 | 1/1982 | Thrower, Jr. et al. | 315/82 |
| 4,684,819 | 8/1987 | Haag et al. | 307/10 R |
| 4,686,423 | 8/1987 | Eydt | 315/82 |
| 4,727,261 | 2/1988 | Fairchild | 307/10 LS |
| 4,739,226 | 4/1988 | Murata | 315/224 |
| 4,841,198 | 6/1989 | Wilhelm | 315/82 |
| 5,072,154 | 12/1991 | Chen | 315/82 |
| 5,081,565 | 1/1992 | Nabha et al. | 362/61 |
| 5,293,077 | 3/1994 | Seki et al. | 307/10 B |
| 5,343,125 | 8/1994 | Bernitz et al. | 315/245 |

*Primary Examiner*—Benny Lee
*Assistant Examiner*—David Vu
*Attorney, Agent, or Firm*—Vincent A. Cichosz

[57] ABSTRACT

A motor vehicle has a daytime running light system for providing automatic illumination of a pair of headlamps at reduced intensity. The reduced intensity operation is accomplished by way of a switch mode power converter which operates to provide a daytime running light voltage that is less than the vehicle system voltage normally supplied to the headlamps. The switch mode power converter makes extremely efficient use of the vehicle electrical power by minimizing power dissipation in attaining a lower daytime running light voltage. Furthermore, the daytime running light system is amenable to simple calibration modification to implement varying daytime running light voltage levels in accordance with vehicle system and/or various international requirements.

8 Claims, 2 Drawing Sheets

MOTOR VEHICLE DAYTIME RUNNING LIGHT SYSTEM HAVING BUCK SWITCH MODE CONVERTER

BACKGROUND

This invention relates to daytime running lights for motor vehicles. More particularly, it is concerned with such systems which utilize conventional headlights to provide reduced intensity daytime running light illumination.

Headlight daytime running light systems are known which have a voltage dropping device selectably coupled in series with the headlamps to reduce the voltage thereacross the headlamps, thereby reducing the light output thereof. Such an arrangement wastes significant power through heat dissipation and requires relatively costly devices capable of such dissipation capacities.

Other headlight daytime running light systems utilize pulse width modulation control of the current through the headlight filaments to reduce the average power therethrough and light output thereof. However, rapid power level current switching through the large circuit loops of the vehicle wiring generates significant levels of undesirable electromagnetic noise. Addressing such shortfalls adds considerable expense to such a system.

Yet other systems are known which effectuate a series connection of the vehicle headlamps to drop substantially one-half the system voltage across each headlamp to thereby reduce light output. Such a system is inflexible in the control of the light output, which control may be desirable based upon differing international requirements.

SUMMARY

Therefore, it is a general objective of the present invention to overcome the various shortfalls of various daytime running light systems. The various features of the present invention provide for an energy efficient, electrical noise attenuated and flexibly calibratable daytime running light system.

In accordance with one aspect of the present invention, a pair of headlamps are selectively coupled to a source of system voltage for operation at full intensity. The same headlamps are automatically coupled to a source of daytime running light voltage at a potential less than the system voltage for operating the headlamps at less than full, or daytime running, illumination. The daytime running light voltage is generated by a circuit including a buck switchmode converter effective to produce a daytime running light voltage which is less than the system voltage when said ignition switched is closed and said headlamps are not connected to system voltage.

In accordance with another preferred aspect of the present invention, the daytime running light operation is disabled in response to one or more predetermined vehicle operating parameters including such parameters as head light switch position and vehicle mobility.

BRIEF DESCRIPTION OF THE DRAWINGS

The present invention will now be described by way of example, with reference to the accompanying drawing FIGS. 1A and 1B illustrating a detailed schematic circuit embodying the present invention in a conventional automobile lighting electrical system.

DETAILED DESCRIPTION

Figure 1A:
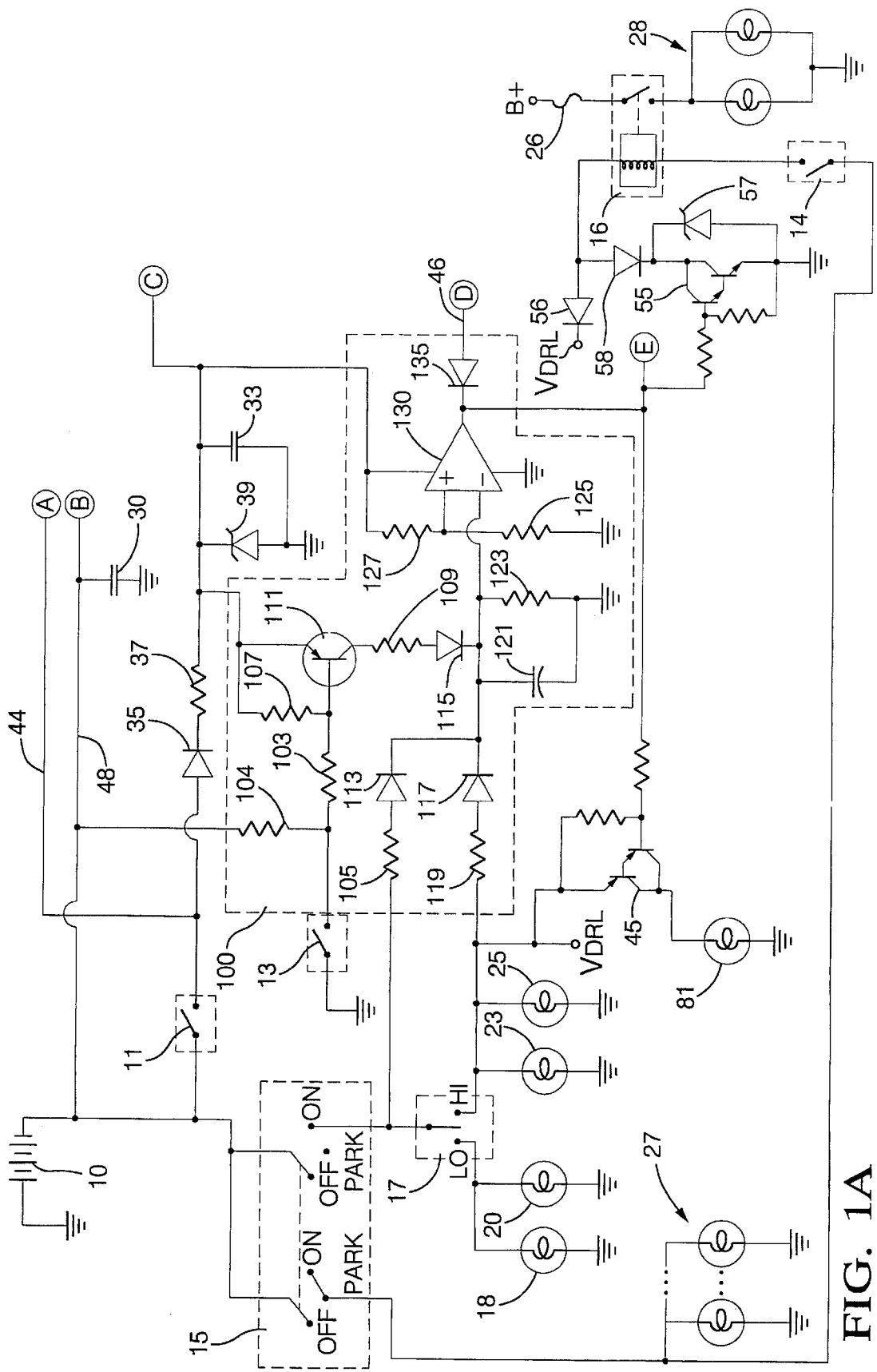
Figure 1B:
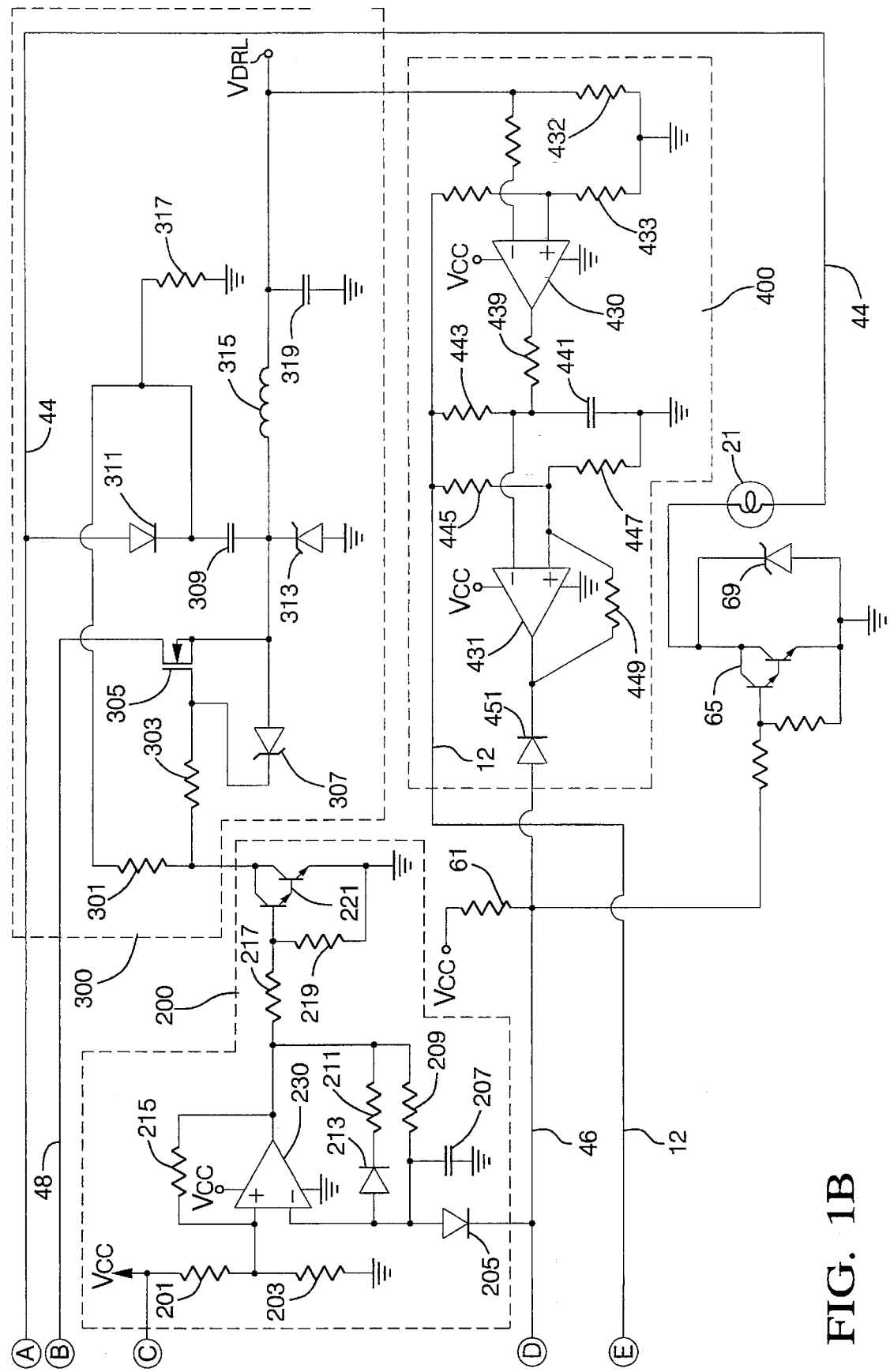

FIGS. 1A and 1B illustrate in detail a schematic circuit of a vehicle electrical system embodying a daytime running light system in accord with the present invention. Vehicle battery 10, such as a conventional 12 volt battery, is part of a standard vehicle electrical power system including an engine driven alternator and voltage regulator. Such systems are generally operative at between 12 and 16 volts. Battery 10 is shown coupled at the negative terminal thereof to vehicle ground. The positive terminal is selectively coupled through a set of park light contacts of standard head light switch 15 to a conventional arrangement of grounded vehicle parking lights 27 including any of a multiplicity of bulbs located in various locations on the vehicle, and may include front and rear parking lights and side marker lights. A set of headlight contacts of head light switch 15 likewise selectively couples system voltage through a conventional beam change switch 17 to one of a set of low beam headlamps 18,20 and high beam headlamps 23,25 via Lo and Hi contacts, respectively, to vehicle ground in accord with the position of the beam change switch.

The park light contacts of head light switch 15 are also coupled through a fog light switch 14 to one side of fog light relay 16 coil. The other side of relay 16 coil is coupled to the anodes of a pair of back-to-back diodes 56 and 58. The cathode of diode 58 is then coupled to the common collector terminals of darlington transistor pair (solid state switch) 55. The cathode of diode 56 is coupled to the supply side of high beam headlamps 23,25. Transient suppression diode 57 is coupled between the grounded emitter and common collector terminals of the solid state switch 55. Relay 16 when energized closes a set of contacts to thereby couple system voltage B+ across a pair of fog light 28. When DRL mode is active and the high beam headlamps are energized at DRL voltage, line 12 is at a high voltage and solid state switch 55 is activated (closed). In this situation (assuming of course that headlamp switch 15 is in the park position), should the operator close fog lamp switch 14, relay 16 is energized through diode 58 and solid state switch 55, and diode 56 is reverse biased. When DRL mode is inactive, line 12 is at a low voltage and solid state switch 55 is deactivated (open). In this situation (assuming that headlamp switch 15 is in one of the park or on positions and beam change switch 17 is in the Lo position), should the operator close fog lamp switch 14, relay 16 is energized through diode 56 and high beam headlamps 23,25. Selection of the high beam headlamps via the beam change switch 17 Hi contact will not allow for the energization of fog lamp relay 16 due to substantial equivalency of potential across diode 56 and consequently across the coil of relay 16. Such defeat of the fog lamps when high beams are selected comports with generally accepted and practiced modes of high intensity lamp operation.

The high beam contact of beam change switch 17 is also coupled to a high beam indicator bulb, as conventionally found in an instrument cluster array of indicators, through darlington transistor pair (solid state switch) 45. Switch 45 is activated with line 12 grounded (low voltage), and hence the high beam indicator bulb 81 illuminated, when the high beams are activated at full intensity via the head light switch 15 and beam change switch 17. However, when DRL is active and line 12 is at a high voltage, solid state switch 45 is deactivated (open) and the high beam indicator bulb 81 is extinguished.

The positive terminal of battery 10 is also coupled through a contact of conventional ignition switch 11 via conductor 44 to one end of a daytime running light indicator bulb 21 similar to other indicator bulbs found in an instrument cluster display. The other end of bulb 21 is coupled to ground through darlington transistor pair (solid state switch) 65, which is activated with line 46 is not grounded. Diode 69 coupled across the emitter and collector terminals of switch 65 provides transient overvoltage protection therefor.

What follows is a description of a circuit responsive to various vehicle parameters for establishing the pair of high beam headlights 23,25 at reduced intensity for daylight running operation. This is generally accomplished when the predetermined vehicle parameters enable the daytime running light circuit to supply the high beam headlight circuit with a DRL voltage that is less than the normal system voltage.

The portion of the circuit generally labeled 100 (DRL enable circuit 100) is effective to enable and disable such daytime running light function in accordance with various predetermined vehicle parameters sensed thereby. Among these parameters is, preferably, an indication of vehicle mobility such as, for example, a park brake switch 13 which is shown closed when the vehicle is in a parked position. It may be associated with a hand or foot operated park or emergency, brake or alternatively may be activated when a gear select lever is in the park position of an automatic transmission. Alternatively, such other vehicle parameters, indicating vehicle mobility, such as a transmission output shaft speed signal adapted for the present application. Additionally, another parameter is the normal headlamp operation which is activated when the operator selects normal full intensity headlight operation via head light switch 15. Alternatively, such full intensity headlight operation may be invoked by well known automated systems responsive to ambient light conditions to turn the headlights on without operator actuation of the head light switch 15.

Two other portions of the circuit, generally labeled 200 and 300, together operate to establish the DRL voltage that is less than the normal system voltage. Portion 200 (oscillator 200) comprises an oscillator circuit calibrated for frequency and duty cycle to control portion 300 (power converter 300) which comprises a switched mode power converter having a DRL voltage output that is less than the normal system voltage.

The portion generally labeled 400 (DRL output protection circuit 400) provides for short circuit protection should the DRL voltage output become shorted to ground or otherwise be excessively pulled down.

Firstly, system voltage is supplied to power converter 300 by conductor 48. Capacitor 30 reduces conducted transients from power converter 300. Ignition switch 11 supplies system voltage through reverse voltage protection diode 35 and resistor 37 to parallel coupled zener diode 39 and capacitor 33. Diode 39 and capacitor 33 provide for transient over voltage protection of supply voltage (Vcc) for powering solid state components of the system. Supply voltage Vcc is coupled to other similarly labeled portions of the circuit. Although shown provided through a plurality of disjunct terminals, Vcc is actually directly connected to the similarly labeled portions of the circuit through conductors purposefully omitted from the Figures for improved legibility. All comparators illustrated (130, 230, 430, 431) are of the type having an output comprising the collector of a grounded emitter transistor. Therefore, each comparator output is either ground (low) due to a respective inverting input at a higher voltage than a respective non-inverting input, or open collector (high) due to a respective inverting input at a lower voltage than a respective non-inverting input.

DRL enabling circuit 100 comprises comparator 130 having a pair of resistors 127, 125 effective to establish a setpoint voltage at the non-inverting input thereto. The inverting input to the comparator is coupled to capacitor 121 and resistor 123 in series to ground. In the absence of a substantial voltage source being coupled to the inverting input of the comparator 130, resistor 123 pulls the input low thereby resulting in a high output state. This establishes a high output state on line 12 signifying all predetermined DRL enabling parameters have been satisfied. The inverting input to the comparator has a plurality of lines coupled thereto through respective isolation diodes 113, 115, and 117. If any one of these lines couples to a voltage source, such as system voltage or Vcc, the output of the comparator pulls lines 12 and 46 low, the effect of which disables the oscillator 200 and power converter 300. One of these sense lines is coupled to the high beam headlights through resistor 119 and is used to detect an excessive voltage condition thereat when DRL operation is otherwise appropriate (i.e. other DRL enabling parameters having been met). Another one of these sense lines is coupled to the power source terminal of beam change switch 17 through resistor 105 and is used to detect when normal operation of the headlights has been selected such as through operation of the head light switch 15. Normal operation of the headlights disables the DRL operation. Yet another sense line is used to detect the position of the park brake switch 13. The park brake switch is assumed to be a ground side switch closed when the park brake is applied. As such, coupling to a voltage source when the park brake switch is opened is facilitated by way of solid state switch 111 and biasing network of resistors 107, 103, and 104. The base of solid state switch is coupled to park brake switch 13 such that an open state of the park brake switch 13 results in an open state of the solid state switch 111 and vice-versa. A closed state of solid state switch 111 couples the present line to Vcc through resistor 109.

In addition to the effects upon the DRL operation, the DRL enabling circuit 100, via line 12, inhibits illumination of high beam indicator bulb 81 during DRL operation by closing solid state switch 45 as previously described, and provides for a ground path for the energization of fog lamp relay 16 via activated solid state switch 55 as previously described. DRL enabling circuit 100, via line 46 provides for the illumination of the DRL indicator bulb 21 during DRL operation by closing solid state switch 65. Line 46 is pulled high through resistor 61 when DRL is activated.

Functionally, oscillator 200 comprises comparator 230, resistors 201,203,209,211 and 215, diode 213, and capacitor 207. Oscillator 200 operates essentially as a well known relaxation oscillator so long as the inverting input of the comparator is allowed to swing. However, if line 46 goes low by way of a low output at either comparator 130 or 431 of DRL enable circuit 100 or DRL output protection circuit 400, respectively, so too does the inverting input of comparator 230 through diode 205, and hence the output of comparator 230 assumes a stable high output state. As general considerations, the frequency of oscillation is chosen such that any voltage ripple at the output is not offensively notable to an observer and such that undesirable radio frequency interference is at acceptably low levels. The inventors have found that an oscillation frequency of substantially 60 to 70 Hz provides acceptable results. Comparator 230 output couples to darlington transistor pair (solid state switch) 221 by way of biasing resistors 217 and 219. A high output from comparator 230 activates solid state switch 221 thereby coupling the collector output thereof to system ground. A low output from comparator 230 de-activates solid state switch 221 thereby providing an open collector output therefrom.

The output (common coupled collectors of solid state switch 221) of the oscillator circuit 200, provides the controlling input to power converter 300. Power switching transistor 305 is controlled by voltage doubling gate drive circuit comprising system voltage at the anode of diode 311, capacitor 309, resistors 301 and 303, and oscillator 200 output. Zener diode 307 provides voltage clamping protection to power switching transistor 305. Diode 313, power inductor 315 and power capacitor 319 comprise the DC power output section of power converter 300 providing the DRL voltage at the DRL voltage output ($V_{DRL}$) at less than normal system voltage. Power down resistor 317 provides for rapid discharge of capacitor 309 to effectuate swift turn off of power switching transistor 305 and consonant rapid decay of the DRL output voltage $V_{DRL}$. It can be seen that the DRL voltage output $V_{DRL}$ is coupled to the high beam headlights, the disjunct labeling of $V_{DRL}$ in the Figures being merely for convenience of illustration, it being understood that the two portions of the circuit so labeled $V_{DRL}$ are physically coupled together.

The DRL voltage output $V_{DRL}$ is monitored by DRL output protection circuit 400. Should the DRL output voltage drop below a predetermined value, line 46 will be pulled low through diode 451 by the grounded collector output of comparator 431. This low output state is latched until the next ignition cycle (opening of ignition switch 11). The monitoring and latch functions will now be described in more detail beginning with a closing of the ignition switch 11.

Assuming all parameters for the enablement of DRL operation are satisfied, Vcc comes up through the charging of capacitor 33 and line 12 takes on a high state through the open collector output of comparator 130 of DRL enable circuit 100. Alternatively, assuming that one or more parameters for the enablement of DRL operation are not satisfied, line 12 will come up to a high state when all parameters are satisfied. Comparator 430 will come up with a high output (open collector) since the non-inverting input is at a preset voltage established by resistors 433 and 435, and the inverting input is held lower than the preset voltage until power capacitor 319 charges. Capacitor 441 will begin to charge through resistors 443 and 439. Capacitor 441 keeps the inverting input of comparator 431 below the non-inverting input thereby allowing the output state thereof to come up high and prevent it from incorrectly latching low. The inverting input of comparator 430 eventually exceeds the non-inverting input thereof by achieving DRL output voltage and the output of comparator 430 takes on a naturally low state. The inverting input of comparator 431 is thereby stabilized at a voltage established by the resistors 443 and 439, which voltage is lower than a first setpoint voltage at the non-inverting input of comparator 431 established by the parallel combination of resistors 449 and 445 in series with resistor 447.

If the DRL voltage drops below the voltage established at the non-inverting input of comparator 430, the output thereof goes high, also pulling the inverting input of comparator 431 high as capacitor 441 charges. When the voltage at the non-inverting input of comparator 431 is exceeded, the output thereof goes low. This establishes a second setpoint voltage at the non-inverting input established by the parallel combination of resistors 449 and 447 in series with resistor 445 which is lower than the voltage established when the comparator 430 is in a low output state. Therefore, if the condition which first caused the DRL voltage to go low subsides and comparator 430 reassumes a low output state, the voltage seen at the inverting input of comparator 431 now exceeds the second setpoint voltage at the non-inverting input thereof. From this, it shall be appreciated that the DRL output protection circuit 300 will latch the DRL operation off until the next ignition cycle.

The preceding detailed description sets forth a preferred embodiment and implementation of the invention. As such, it is intended, and to be understood, to be taken by way of non-exhaustive example of the invention as set forth in the appended claims.

We claim:

1. A motor vehicle daytime running light system for operating a pair of headlamps at reduced intensity from normal headlamp operation, comprising:

a source of system voltage;

an ignition switch selectively operable between closed and open positions;

a pair of headlamps operable at full intensity when connected to system voltage; and, a circuit including a buck switch-mode converter having an output connected to the pair of headlamps, said circuit effective to produce a daytime running light voltage at the output thereof which is less than the system voltage when said ignition switched is closed and said headlamps are not connected to system voltage.

2. A motor vehicle daytime running light system as claimed in claim 1 wherein said circuit is further responsive to at least one predetermined vehicle parameter to disable the operation of the converter.

3. A motor vehicle daytime running light system as claimed in claim 2 wherein said at least one vehicle parameter comprises an indication of a head light switch position.

4. A motor vehicle daytime running light system as claimed in claim 2 wherein said at least one vehicle parameter comprises an indication of vehicle mobility.

5. A motor vehicle daytime running light system as claimed in claim 4 wherein said indication of vehicle mobility comprises a park brake switch indicative of a park brake engagement.

6. A motor vehicle daytime running light system as claimed in claim 4 wherein said indication of vehicle mobility comprises a gear select lever switch indicative of a gear select lever park position.

7. A motor vehicle daytime running light system for operating one of a pair of high-beam headlamps and a pair of low-beam head lamps at reduced intensity from normal headlamp operation, comprising:

a source of system voltage;

an ignition switch selectively operable between closed and open positions;

said high-beam and low-beam headlamp pairs operable at full intensity when connected to system voltage; and, a circuit including a buck switch-mode converter having an output connected to one of the high-beam and low-beam headlamp pairs, said circuit effective to produce a daytime running light voltage at the output thereof which is less than the system voltage when said ignition switched is closed and neither one of said high-beam and low beam headlamp pairs is connected to system voltage.

8. A motor vehicle daytime running light system for operating a pair of headlamps at reduced intensity from normal headlamp operation, comprising:

a source of system voltage;

an ignition switch selectively operable between closed and open positions;

a pair of headlamps operable at full intensity when connected to system voltage;

a buck switch-mode converter circuit having an output connected to the pair of headlamps and operable when enabled for producing a daytime running light voltage at the output thereof which is less than the system voltage; and, daytime running light enabling circuit having a head light switch position input, and a park brake switch position input, said daytime running light enabling circuit effective to enable the buck switch-mode converter circuit when the headlight switch position input indicates that normal head light operation is not selected and the park brake switch position indicates that vehicle mobility is not impeded.

\* \* \* \* \*